(12) United States Patent
Evans et al.

(10) Patent No.: US 6,732,238 B1
(45) Date of Patent: May 4, 2004

(54) SET-ASSOCIATIVE CACHE MEMORY HAVING VARIABLE TIME DECAY REWRITING ALGORITHM

(75) Inventors: Marc Alan Evans, San Jose, CA (US); Pavlos Konas, Mountain View, CA (US)

(73) Assignee: Tensilica, Inc., Santa Clara, CA (US)

( * ) Notice: Subject to any disclaimer, the term of this patent is extended or adjusted under 35 U.S.C. 154(b) by 207 days.

(21) Appl. No.: 10/167,133

(22) Filed: Jun. 10, 2002

Related U.S. Application Data

(60) Provisional application No. 60/296,932, filed on Jun. 8, 2001, and provisional application No. 60/310,032, filed on Aug. 3, 2001.

(51) Int. Cl.[7] .............................................. G06F 12/00
(52) U.S. Cl. ........................ 711/128; 711/133; 365/49
(58) Field of Search ....................... 711/122–136, 154, 711/159–160, 205–207; 365/49

(56) References Cited

U.S. PATENT DOCUMENTS

| | | | | |
|---|---|---|---|---|
| 4,464,712 A | * | 8/1984 | Fletcher ..................... | 711/122 |
| 5,493,667 A | * | 2/1996 | Huck et al. ................. | 711/125 |
| 5,701,432 A | * | 12/1997 | Wong et al. ................ | 711/130 |
| 5,802,602 A | | 9/1998 | Rahman et al. ............. | 711/204 |
| 6,012,126 A | * | 1/2000 | Aggarwal et al. .......... | 711/133 |

* cited by examiner

Primary Examiner—Nasser Moazzami
(74) Attorney, Agent, or Firm—Pillsbury Winthrop LLP

(57) ABSTRACT

A set-associative structure replacement algorithm is particularly beneficial for irregular set-associative structures which may be affected by different access patterns, and different associativities available to be replaced on any given access. According to certain aspects, methods and apparatuses implement a novel decay replacement algorithm that is particularly beneficial for irregular set-associative structures. An embodiment apparatus includes set-associative structures having decay information stored therein, as well as update/replacement logic to implement replacement algorithms for translation lookup buffers (TLBS) and caches that vary in the number of associativities; have unbalanced associativity sizes, e.g., associativities can have different numbers of indices; and can have varying replacement criteria. The implementation apparatuses and methods provide good performance, on the level of LRU, random and clock algorithms; and is efficient and scalable.

24 Claims, 6 Drawing Sheets

US 6,732,238 B1

SET-ASSOCIATIVE CACHE MEMORY HAVING VARIABLE TIME DECAY REWRITING ALGORITHM

CROSS-REFERENCE TO RELATED APPLICATIONS

The present application is based on, and claims priority from, U.S. provisional application No. 60/296,932, filed Jun. 8, 2001, commonly owned by the present assignee, the contents of which are incorporated herein by reference. The present application is also related to U.S. provisional application No. 60/310,032, filed Aug. 3, 2001 and U.S. application Ser. No. 10/213,370 based thereon, also commonly owned by the present assignee, the contents of which are also incorporated herein by reference.

BACKGROUND OF THE INVENTION

1. Field of the Invention

The present invention is directed to microprocessor architectures. More particularly, the invention is directed to TLBs and cache memories for speeding processor access to main memory in microprocessor systems. Even more particularly, the invention is directed to methods and apparatuses for implementing novel refill policies for multi-way set associative caches and TLBs.

2. Background of the Related Art

Caches and Translation Lookaside Buffers (TLBs) are ubiquitous in microprocessor design. For general information on such microprocessor structures, see J. L. Hennessy and D. A. Patterson, *Computer Architecture: A Quantitive Approach* (1996), Chapter 5.

Generally, the speed at which a microprocessor (e.g. a CPU) operates depends on the rate at which instructions and operands are transferred between memory and the CPU. As shown in FIG. 1, a cache 110 is a relatively small random access memory (RAM) used to store a copy of memory data in anticipation of future use by the CPU 120. Typically, the cache 110 is positioned between the CPU 120 and the main memory 130 as shown in FIG. 1, to intercept calls from the CPU 120 to the main memory 130. When the data is needed, it can quickly be retrieved from the cache 110, rather than obtaining it from the slow main memory 130.

A cache may be implemented by one or more RAM integrated circuits. For very high speed caches, the RAM is usually an integral part of the CPU chip. The data stored in a cache can be transferred to the CPU in substantially less time than data stored in main memory.

A translation look-aside buffer (TLB) 140 is a special form of cache that is used to store portions of a page table (which may or may not be stored in main memory 130). As is known, the page table translates virtual page numbers into physical page numbers. TLB 140 is typically organized to hold only a single entry per tag (each TLB entry comprising, for example, a physical page number, permissions for access, etc.). In contrast, cache 110 is typically organized into a plurality of blocks, wherein each block has a corresponding tag and stores a copy of one or more contiguously addressable bytes of memory data.

In order to access data in the cache 110, the virtual memory address is broken down into a cache address as shown in FIG. 2. The portion of the cache address including the most significant bits of the memory address is called the tag 240, and the portion including the least significant bits is called the cache index 250. The cache index 250 corresponds to the address of the block storing a copy of the referenced data, and additional bits (i.e. offset 260) are usually used to address the bytes within a block, if each block has more than one byte of data. The tag 240 is used to uniquely identify blocks having different memory addresses but the same cache index 250. Therefore, the cache 110 typically includes a data store and a tag store. The data store is used for storing the blocks 270 of data. The tag store, sometimes known as the directory, is used for storing the tags 240 corresponding to each of the blocks 270 of data. Both the data store and the tag store are accessed by the cache index 250. The output of the data store is a block 270 of data, and the output of the tag store is a tag 240.

There are different types of caches, ranging from direct-mapped caches, where a block can appear in only one place in the cache 110, to fully-associative caches where a block can appear in any place in the cache 110. In between these extremes is another type of cache called a multi-Way set-associative cache wherein two or more concurrently addressable RAMs can cache a plurality of blocks 270 and tags 240 for a single cache index 250. That is, in a conventional N-Way set-associative cache, the single cache index 250 is used to concurrently access a plurality N of blocks 270 and tags 240 in a set of N RAMs. The number of RAMs in the set indicates the Way number of the cache. For example, if the cache index 250 is used to concurrently address data and tags 240 stored in two RAMs, the cache is a two-Way set-associative cache.

As shown in FIG. 2, during the operation of a single-index multi-Way set-associative cache, a memory access by the CPU causes each of the RAMs 1 to N to be examined at the corresponding cache index location. The tag is used to distinguish the cache blocks having the same cache index but different memory addresses. If a tag comparison indicates that the desired data are stored in a cache block of one of the RAMs, that RAM is selected and the desired access is completed. It should be noted that caches are generally indexed with a virtual address and tagged with a physical address.

A multi-Way set-associative cache provides the advantage that there are two or more possible locations for storing data in blocks having the same cache index. This arrangement reduces thrashing due to hot spots in memory and increases the operating speed of the computer system if the hot spots are uniformly distributed over the blocks of RAM.

As further shown in FIG. 2, simultaneously with an access to cache 110, an access to TLB 140 can be made to translate the virtual address into a physical address. It should be noted that, although FIG. 2 shows the virtual page number comprising the same bits as tag 240 and index 250 combined, that this is not necessary, and in fact the bit ranges for the different fields may be different. It should be further noted that the page offset and the offset 260 may also comprise different bit ranges.

Although not shown in detail in FIG. 2, TLBs can also be implemented using a range from direct-mapped to fully associative types of caches. In particular, the TLBs that implement Xtensa MMU from Tensilica, Inc. (see co-pending application Ser. No. 10/213,370; and the Xtensa ISA) are set-associative memories that cache entries from the page table. These caches are implemented with logic synthesis of standard cells and can make use of heterogenous ways (i.e. different ways may have different sizes). As described in the co-pending application, the Xtensa MMU includes a feature called Variable Page Sizes. There are a couple of things that make this happen. First, at configuration time, each way can be configured to support some different page sizes. Hardware is generated to support all of the page sizes configured. At run time, the operating system will program each way with a single page size it is translating at any given time. In one example implementation, a special runtime configuration register is provided that allows each way to be programmed by the operating system to perform translations for a certain page size.

Due to this novel feature, different access patterns happen because either the ways have different numbers of indices, the ways are translating different page sizes, or both. For example, assume there is a way that is four entries and can support 4 kB or 4 MB pages. If it is programmed to translate 4 kB pages, then the index would be VirtAddr[13:12]. If it were programmed to translate 4 MB pages, the index would be VirtAddr[23:22]. Now, assume there are four of these ways. At any given time, some of them may be programmed to translate 4 kB pages, and others may be programmed to translate 4 MB pages.

In case of a cache miss (in either cache 110 and/or TLB 140), a determination is made to select one of the blocks/entries for replacement. Methods of implementing a replacement strategy for data in a cache are known in cache design. Typically, the replacement of cache entries are done in a least recently used (LRU) manner, in which the least recently used block is replaced. A more flexible strategy is the not most recently used (NMRU), which chooses a block among all those not most recently used for replacement. Blocks may also be selected at random for replacement. Other possible strategies include pseudo-LRU (an approximation of true-LRU that is more easily implemented in hardware); Least Recently Filled; and a clock algorithm used by software for managing replacements of pages in a page table.

Thus, when a set-associative cache or TLB "misses," it needs to be refilled from memory. The data retrieved from memory will be stored in an entry chosen from the ways. The replacement algorithm (e.g. LRU, NMRU, LRF, etc.) is used to decide exactly which way's entry will get replaced. The replacement algorithm can have adverse affects on processor performance by making bad choices for replacement. This affects the cache's "hit rate." For instance, replacing data which will be used soon is worse than replacing data that will not be used again, because the first choice would cause another "miss," whereas the second choice would not. Further, when the TLB is refilled from the Page Table, the replacement policy should take care to place the PTE in an appropriate way (i.e., inspect the associated configuration register and place the PTE in one of the ways, if any, that has been programmed to translate its page size).

Although set-associative memories with heterogenous ways can provide value over traditional set-associative memories with homogenous ways, replacement algorithms that work on a "set" basis either no longer work, are inefficient, or are difficult to implement. The primary cause of this is due to the ever-changing nature of access patterns in the set-associative memory as mentioned above. Consider the TLB presented in the above example vs. a homogenous 4 way 4 entry TLB. The TLB in the previous example has 8 unique access patterns, whereas the TLB with homogeneous ways does not (this TLB will read out the entry from the same index in each way).

In particular, current replacement algorithms are ill suited towards, or inefficient at one or more of the following: (1) handling heterogenous ways that can even allow the indexing of ways to change at run-time (i.e. Is the way configured to translate 4 KB or 4 MB pages); (2) handling way replacement criteria (i.e. Is the way configured to translate 4 KB or 4 MB pages); and (3) handling associative structures that do not have 2**N ways.

For example, algorithms such as NMRU, LRF, and pseudo-LRU are usually implemented with homogenous set-associative structure with only 1 piece of replacement information being stored per set. This replacement information could be log2(number of ways) bits for an LRF algorithm that just stores a pointer to the last way that was filled. It is difficult to modify this basic premise (of replacement information needed on a set basis) to cover the robust nature of the set-associative structures such as the TLBs presented earlier, which have different numbers of entries per way, different indexing of each way (at run-time), and different considerations for replacement. Most LRU implementations have similar issues, since they implement state that tracks LRU on a set basis.

SUMMARY OF THE INVENTION

A set-associative structure replacement algorithm is particularly beneficial for irregular set-associative structures which may be affected by different access patterns, and different associativities available to be replaced on any given access. According to certain aspects, the present invention includes methods and apparatuses that implement a novel decay replacement algorithm that is particularly beneficial for irregular set-associative structures. An embodiment of the present invention includes set-associative structures having decay information stored therein, as well as update/replacement logic to implement replacement algorithms for translation lookup buffers (TLBs) and caches that vary in the number of associativities; have unbalanced associativity sizes, e.g., associativities can have different numbers of indices; and can have varying replacement criteria. The implementation provides good performance, on the level of LRU, random and clock algorithms; and is efficient and scalable.

BRIEF DESCRIPTION OF THE DRAWINGS

These and other aspects of an embodiment of the present invention are better understood by reading the following detailed description of the preferred embodiment, taken in conjunction with the accompanying drawings, in which.

DETAILED DESCRIPTION OF PRESENTLY PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
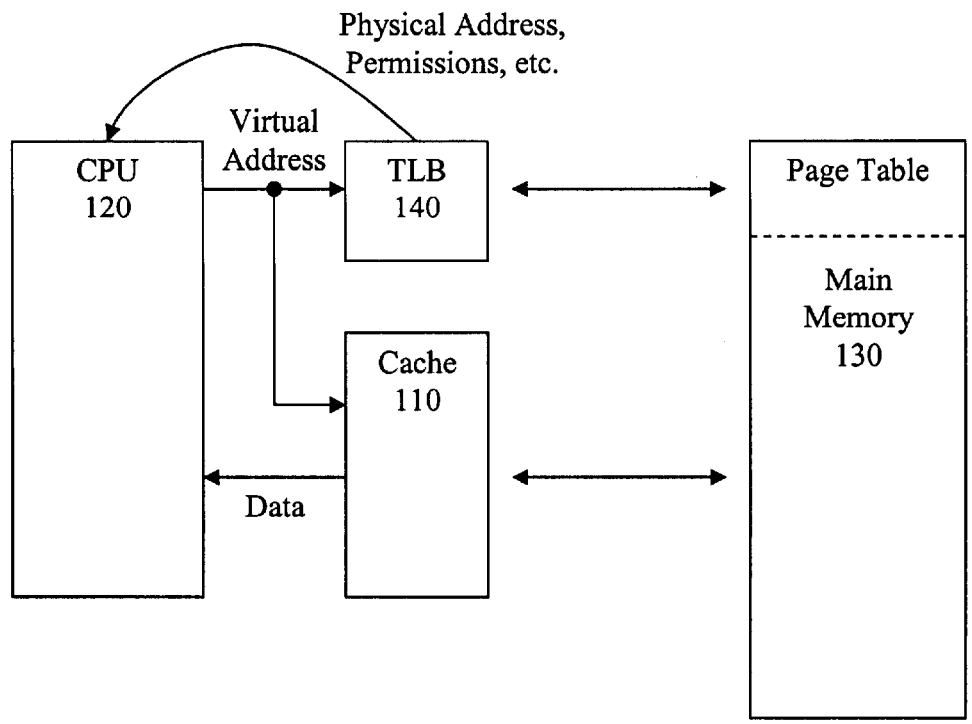
FIG. 1 shows the use of caches and TLBs to access memory data and page table data.
Figure 2:
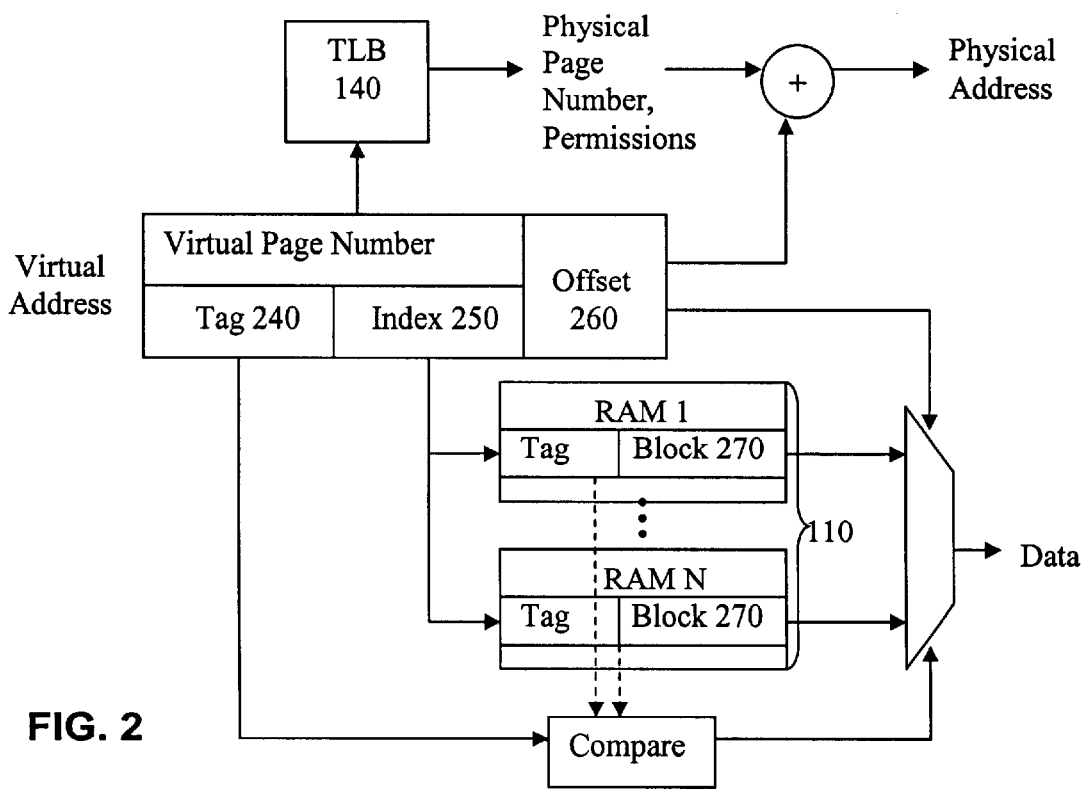
FIG. 2 shows how virtual addresses can be used to access entries in set associative caches and TLBs.
Figure 3:
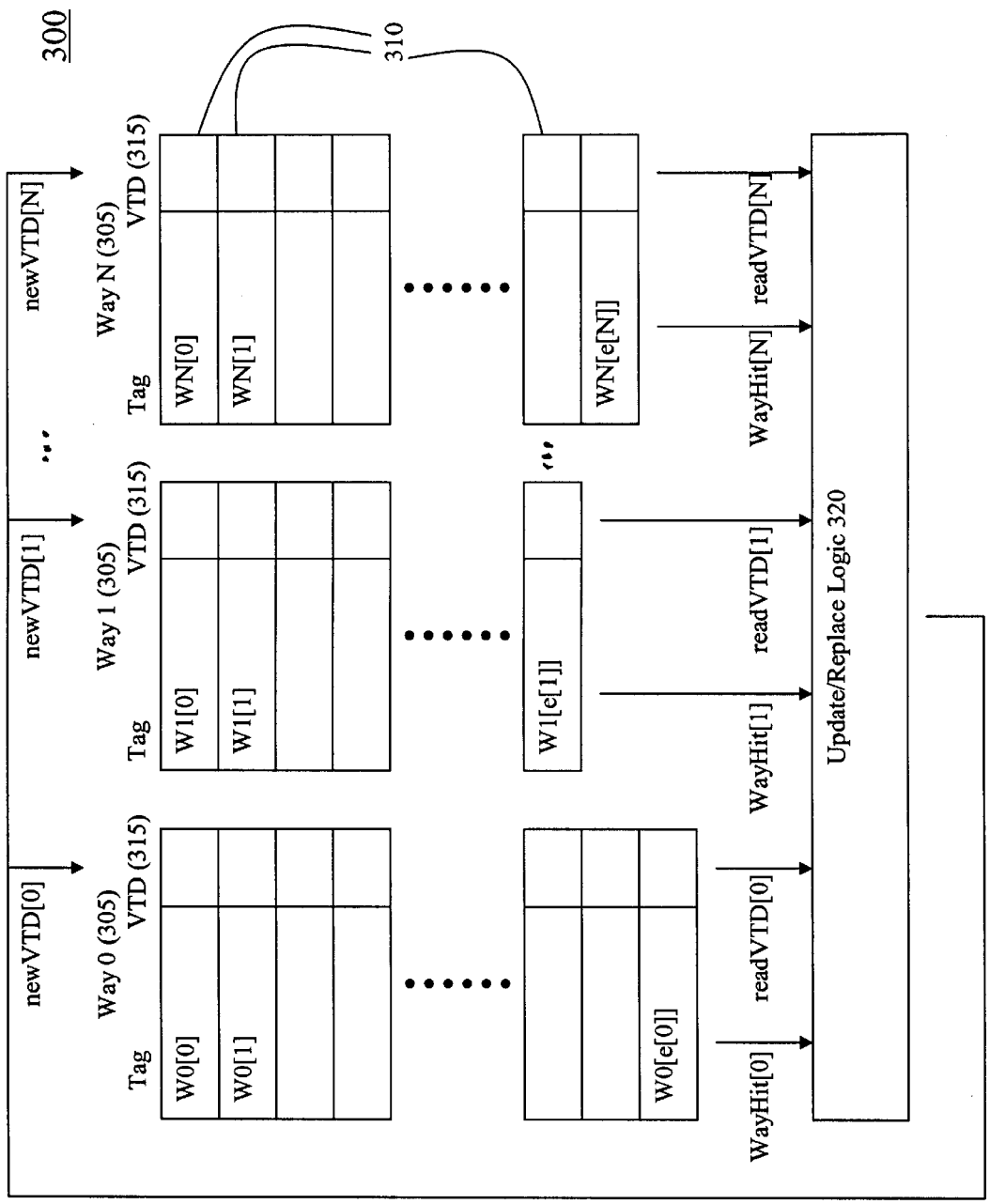
FIG. 3 is a block diagram illustrating a set-associative cache structure in accordance with the present invention.

A top-level block diagram of one example implementation of a cache memory in accordance with the invention is shown in FIG. 3. As shown in FIG. 3, memory 300 is an N-Way set-associative cache where each Way wayk 305, $0 \leq k < N$, has a number of entries 310 e[k]. That is, the number of entries 310 in two or more Ways 305 may be different, they may be able to accommodate different numbers of pages (if the cache 300 is a TLB), etc. The total number of entries 310 in the entire system is given by totalEntries in foreach Way (0 . . . N){totalEntries=totalEntries+e[way]}

Here, totalEntries is (when finished) the total number of entries 310 held in the set associative structure 300. In one preferred implementation, each e[k] is a power of 2.

As further shown in FIG. 3, in accordance with the cache replacement features of the present invention, each entry of cache 300 includes a variable time decay (VTD) field 315 and memory 300 further includes VTD update/replace logic 320. Generally, after each access to cache memory 300 as will be described in more detail below, the VTD logic 320 updates the VTD fields 315 in the memory 300 to indicate the value that has been accessed. This will later permit the system to identify a block to overwrite in the event replacement is required. Specifically, once a cache miss occurs in a set full of data, one block within the set must be overwritten with the missed data. In this case, VTD logic 320 examines VTD fields 315 of entries 310 in the set to determine which block should be overwritten.

According to an aspect of the invention, VTD logic 320 and VTD fields 315 together implement a novel Decay Replacement Algorithm (DRA). Generally, the VTD field of each entry is an indication of this entry's "preference" to be replaced. As the entry is used (i.e. this particular entry has "hit"), its "preference" to be replaced is lessened or "decayed." Once an access occurs where all of the involved entries show an equal preference NOT to be replaced, their VTD field is re-set again to preference them all (except the one that most recently "hit") for replacement, and the decaying process begins again. One preferred embodiment uses 1 VTD bit in field 315 per entry. So, for a 4 way set-associative memory, VTD 4'b1111 would show that all ways prefer to be replaced. VTD=4'b0000 would show that all ways prefer NOT to be replaced (this is the "rollover" or re-setting condition). Considering that 4'b0001 shows only 1 way prefers to be replaced, and 4'b1011 shows that any of 3 ways prefer to be replaced, the DRA spans a space that hybrids LRU and NMRU over a window of time that varies depending on when the "rollover" conditions are encountered. Note that the rollover conditions can be encountered as a matter of the difference access patterns shown above.

According to an aspect of the invention, the DRA consists of the following components:

Some storage bits for Decay information on a per entry basis. For example, the above TLB example each entry has a field to store information used by the DRA. This will be referred to as the "VTD" field or "VTD bits."

An update algorithm which looks at the VTD bits read out of the set-associative memory, and generates the new VTD bits to be written back to the memory.

A replacement algorithm which looks at the VTD bits read out of the set-associative structure, and determines which way will be written in the event that a "miss" occurred.

As set forth above, a field 315 of VTD bits must exist for every entry of every way that is to participate in the DRA. These "decay" bits are used to provide a rough measure of elapsed time since an entry has last been used. The width of the VTD field can be N bits wide; however, the implementation presented here only uses one bit. More bits can provide more relative accuracy to the age of entries. At reset, all of the VTD bits are set to "1". Each time the set-associative structure is accessed, the VTD bits are updated by logic 320 according to the update algorithm described below. It should be noted that, although not shown in FIG. 3 so as not to obscure the invention, entries 310 may include additional fields for indicating access permissions, etc., as is known in the art of TLB's and caches.

The DRA update algorithm is responsible for maintaining the VTD bits within each entry. It needs to appropriately decay the VTD fields values, as well as handle any rollover conditions. Different variants of the update algorithm are possible, and will be obvious to someone skilled in the art.

When an access has been made to N-way associative structure 300 where all ways participate in DRA, the update algorithm implemented by logic 320 will make use of the VTD field read out from each way (readVTD[0 . . . N]), as well as which way, if any, "hit" (wayHit[0 . . . N]). The logic 320 will then generate a VTD field to be written back to the entry of each way that was accessed during the lookup (newVTD[0 . . . N]). The following pseudocode is one example of how logic 320 updates the VTD fields 315 upon a memory access:

```
Update (newVTD[0..N], readVTD[0..N], wayHit[0..N]) {
    //perform bit-wise AND between old VTD's and "hit" vector
    temporaryD = readVTD[0..N] & ~wayHit[0..N]
    //If decaying would yield no useful information, then detect this
    //and "rollover" the decay bits. This will allow them to be useful
    //next time around.
    if (temporaryD == 0) {
        newVTD = ~wayHit
    } else {
        newVTD = temporaryD
    }
}
```

It should be noted that, according to the preferred implementation of the invention, one VTD bit will be read from every way during every cache access, even though each way may have different numbers of entries, although preferably the number of entries is a power of 2. This allows the number of bits used as an index into the particular way to be log2 of the number of entries in the way. For example, if there are only 2 entries in the way, 1 bit from the virtual address will be used as an index into the way. If there are 4 entries in the way, 2 bits from the virtual address will be used as an index into the way. If there are 8 entries in the way, 3 bits from the virtual address will be used as an index into the way.

Figure 4:
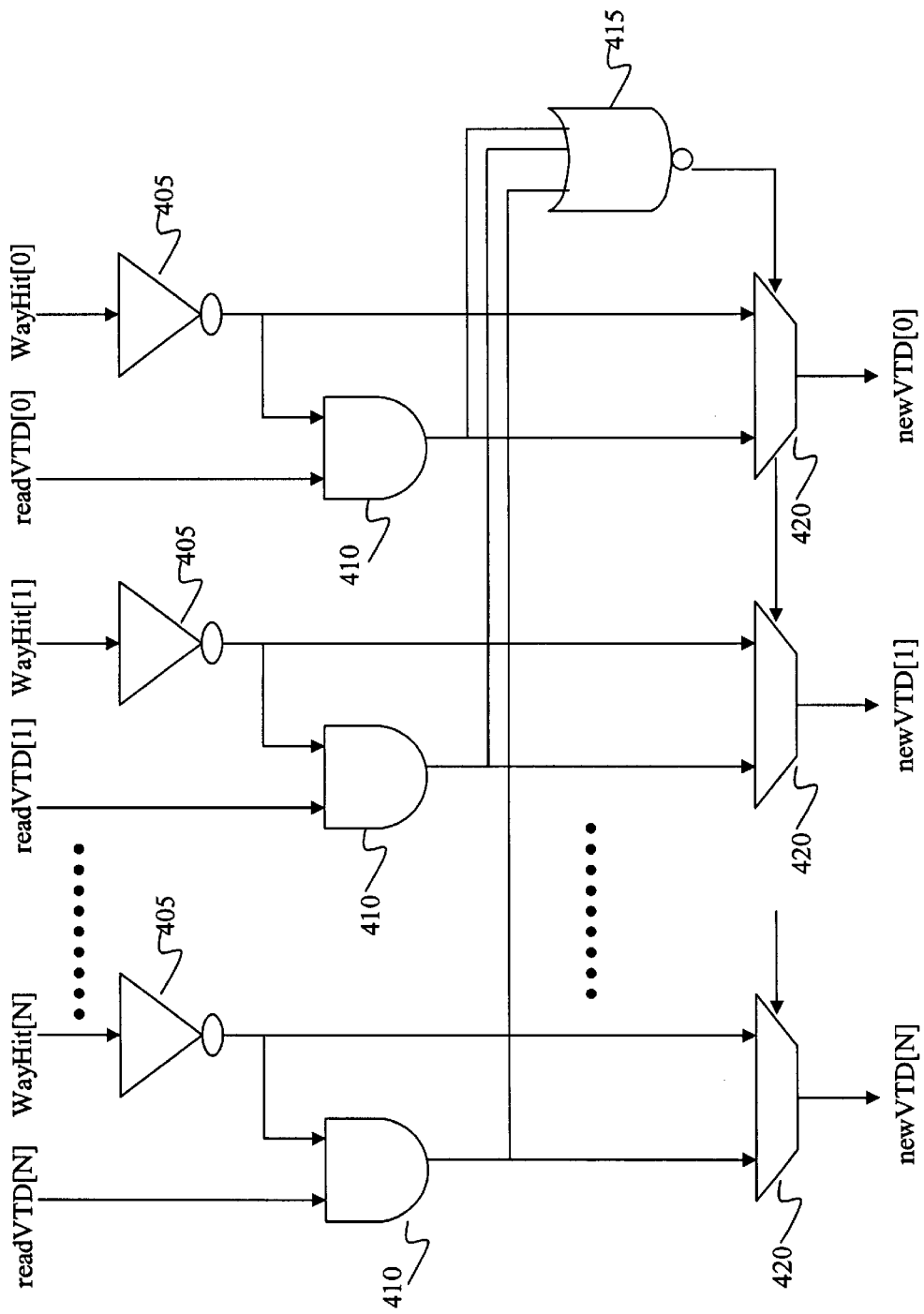
FIG. 4 is a logic diagram illustrating one example structure of logic implementing an DRA update algorithm in accordance with an aspect of the invention.

In one example embodiment of VTD logic 320 according to the invention, the logic portion 400 that can implement this update function is shown in FIG. 4. As shown in FIG. 4, the logic includes a plurality of inverters 405 that perform a bit-wise logical NOT of the "hit" vector, a plurality of AND gates 410 for performing a bit-wise AND between the old VTD's and the inverted "hit" vector, a NOR gate 415 for determining a "rollover" condition, and a plurality of multiplexers 420 for performing a bit-wise selection between the inverted "hit" vector and the newly calculated VTD's.

It should be noted that many variants can be made to the above-described example implementation. For example, more decay information could be kept on a per entry basis (perhaps 2 or 3 bits instead of 1). To accomplish this, the "rollover" would set all of the bits to 1. Any way which hit could then decay by decrementing its decay value. The way with the highest value is the most preferred for replacement.

An example method for implementing an update algorithm as described above is shown in the flowchart of FIG. 5. As shown in the above pseudocode, updating the variable time delay bits 315 is instigated by calling the VTDupdate routine with arguments: new VTD matrix newVTD, old VTD array readVTD, and a vector WayHit having the entry corresponding to the hit entry be 1, versus 0 for all other entries. Every time the memory 300 is accessed, each way must determine hit/miss as already described. In a TLB example, valid accesses can be any load/store through a Data TLB, and any instruction fetch through an Inst TLB.

Figure 5:
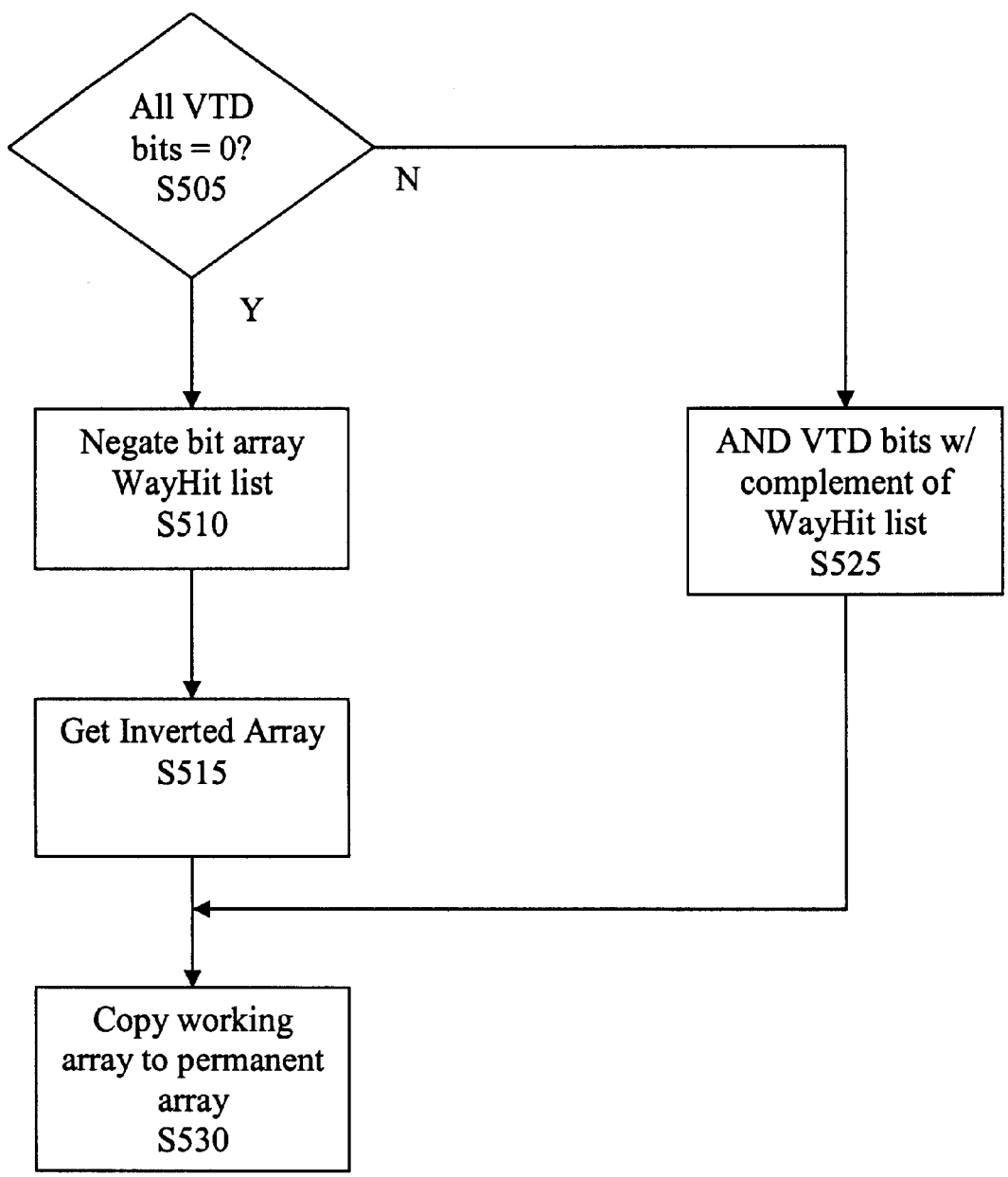
FIG. 5 is a flowchart illustrating one example method implementing a DRA update algorithm in accordance with an aspect of the present invention.

As shown in FIG. 5, the routine first checks to see if all VTDs in the old array readVTD are zero (S505). If so, the routine negates the hit array WayHit(S510) to produce an array in which the hit entry is zero and all others are one (S515), and makes that array an array newVTD. If not (as determined in step S505), the routine decrements the hit VTD by ANDing the current array readVTD with the negation of the hit array WayHit (S525). After adjustment, the update operation is completed by copying the newVTD array into the newVTD matrix (S530).

As mentioned above, once a cache miss occurs in a set full of data, one block within the set must be overwritten with the missed data. In this case, the logic 320 examines the VTD fields 315 of entries 310 in the set to determine which block should be overwritten. Apparatuses and methods for performing a DRA replacement algorithm in accordance with certain aspects of the invention will now be described in more detail.

The DRA replacement algorithm is responsible for choosing a way to write to in the event that the set-associative memory "missed." It does this by looking at the VTD fields read out from each way during the access (readVTD[0 . . . N]), as well as which way meets the replacement criteria (OKReplace[0 . . . N]). It will generate an array VTDReplace[0 . . . N] which tells which way should be replaced using the algorithm described below. In the algorithm, if no error occurs such that no way meets the replacement criteria, VTDReplace [0 . . . N] will be a "one-hot" vector, so that one and only one way is valid for replacement. In one preferred embodiment, a linear search through the ways is used to pick a replacement way. Other algorithms can be used as well, as mentioned below and as will become apparent to those skilled in the art after being taught by the present example.

An example of pseudocode for implementing a replacement algorithm in accordance with one example of the invention is set forth below:

```
Replace (readVTD[0..N], OKReplace[0..N], VTDReplace[0..N]) {
    replaceDecay[N+1] = 1
    replaceDecay[0 . . . N] = 0
    replaceValid[N+1] = 1
    replaceValid[0 . . . N] = 0
    foreach way (0..N) {
        if (OKReplace[way]) {
            replace Valid[way] = 1
        }
        if (readVTD[way] == 1) {
            replaceDecay[way] = 1
        }
    }
    if (replaceDecay > 2**(N+1)) {
        VTDReplace = replaceDecay[0..N]
    } elseif (replaceValid > 2*(N+1)) {
        VTDReplace = replaceValid[0..N]
    } else {
        SoftwareError
    }
}
```

Where:
    OKReplace[way]=VTDconsider(way, PTE)
    The function VTDconsider is simply a Boolean function which indicates whether, given some selection information, a Way should be considered for replacement. For example, in one embodiment the VTDconsider function focuses on whether the specified Way can hold the page-size of the data to be stored:

```
VTDconsider (way, PTE)
    { (PageSize[way] == PTE -> PageSize) ? 1 : 0
}
```

Here, PTE is Page Table Entry. The above function basically tests whether a way is currently programmed to translate the page size specified by the PTE (the data being written into the TLB.)

Figure 6:
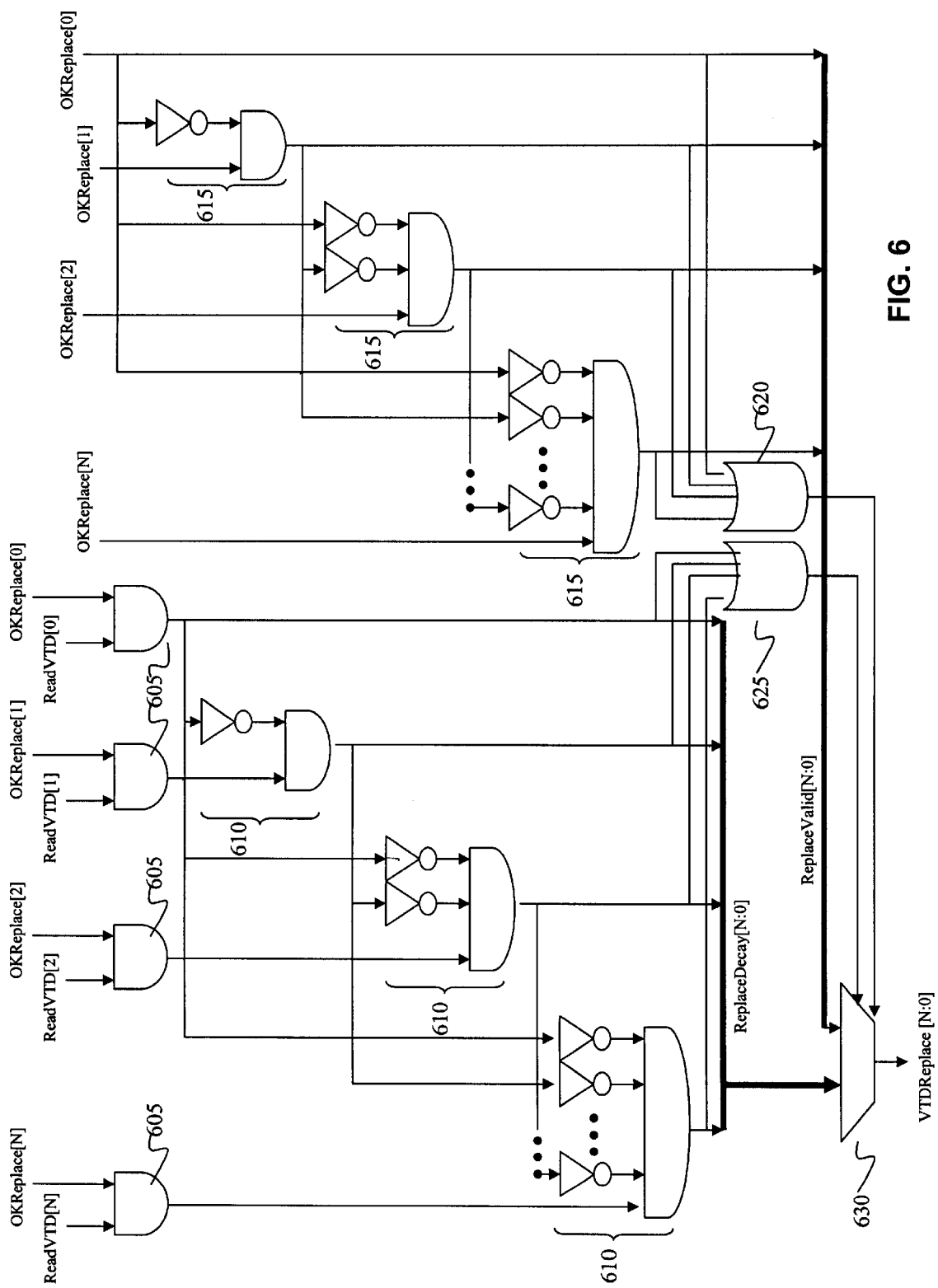
FIG. 6 shows an example logic structure implementing a DRA replacement algorithm in accordance with an aspect of the present invention.

In one example embodiment of VTD logic 320 according to the invention, the logic portion 600 to implement this replace function is shown in FIG. 6. As shown in FIG. 6, this replacement logic portion includes a plurality of AND gates 605 for performing a bit-wise AND between the old VTD bits and the OKreplace vector, a plurality of decay logic stages 610 for providing a decay output for respective ways, if the lower order way did not provide a decay output, a plurality of validity logic stages 615 for providing a validity output for respective ways, if no lower order way provided a validity output, OR gates 620 and 625 for determining whether any validity output or decay output, respectively, was valid, and multiplexer 630 for selecting one of the decay or validity vectors indicating a respective way to be replaced.

Figure 7:
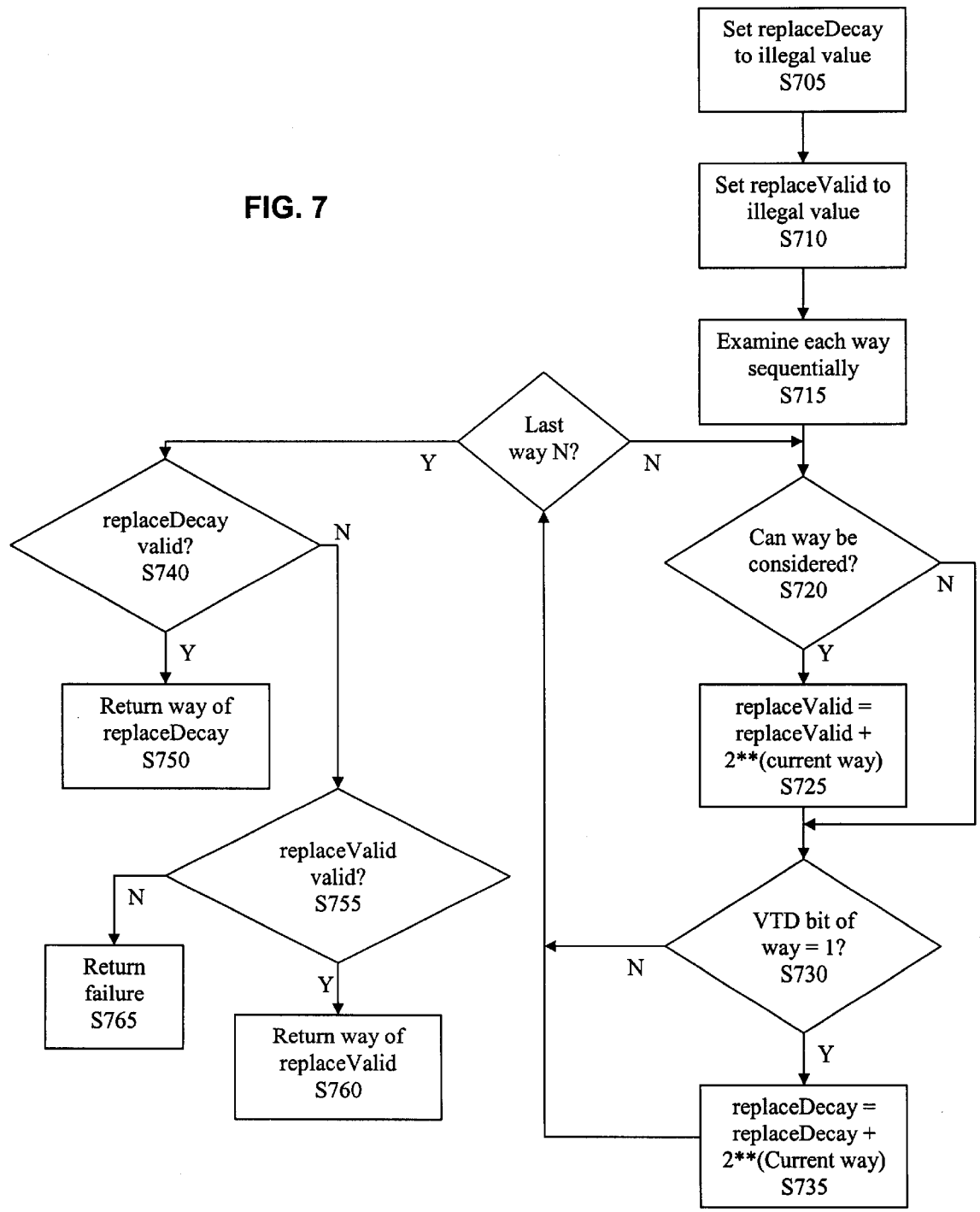
FIG. 7 is a flowchart illustrating an example method implementing a DRA replacement algorithm according to an embodiment of the present invention.

FIG. 7 is a flowchart depicting an example method for implementing a replacement algorithm in accordance with the invention. As set forth in the example above, the Replace routine is called with the current VTD array readVTD as its argument. It uses two variables, VTDReplace and OKReplace, respectively representing a VTD entry which should be replaced and a VTD entry which may be replaced without problems. VTDReplace indicates ways in which the VTD bit has decayed away, and therefore this way is preferred for replacement. OKReplace says that the way in question is eligible for replacement. In one TLB example, where the Page Table Entry says that the translation is for a 4 kB page, only ways which are programmed to translate 4 kB pages would have a corresponding bit set in the OKReplace array.

As shown in FIG. 7, replaceDecay and replaceValid are set to a value, 2**(N+1) for example, which values are illegal in this context, so that they may be checked later (steps S705, S710). Then, the routine examines each way in turn (S715) to see if it may be considered for replacement (determined by the Boolean function VTDConsider) (S720). If so, replaceValid is set at the bit position corresponding to the current way (S725). If the readVTD bit at the position corresponding to this way in the cache entry is 1 (S730), indicating that the entry has not been recently used, replaceDecay is set at the bit position corresponding to the current way (S735) to indicate that this entry should be overwritten.

The way is examined here rather than each entry in the way because, assuming there are four ways of E[k] entries each, once an access is done, the index into each way has been figured out (only one index per way). Thus, only four entries (one per way) that can be replaced need to be considered.

Further, note that the method employed in this embodiment is a hybrid between LRU and NMRU. The embodiment has a list of ways which were recently used (the VTDbits are zero) and a list of ways which are not recently used (VTDbits are 1). So, in the case that only one VTDbit is zero, the embodiment is similar to NMRU. When only one VTDbit is 1, it is more similar to LRU. Additionally, this all happens in a time window that starts when the VTDbits are rolled (because they all went to zero) to the time when they are rolled again (because they all went to zero again). The length of this time window is entirely dependent on the access patterns and hits.

Once all entries have been examined, the routine examines replaceDecay (S740) to see if an entry which should be replaced is available, e.g., if replaceDecay is not equal to 2(N+1). If so, that Way is returned for replacement (S750). If not, the system examines replaceValid (S755) to see if there is an entry which can be replaced, e.g., if replaceValid is not equal to 2(N+1). If so, that Way is returned for replacement (S760). If not, the routine returns an error condition (S765).

The preferred embodiments described above have been presented for purposes of explanation only, and the present invention should not be construed to be so limited. Variations on the present invention will become readily apparent to those skilled in the art after reading this description, and the present invention and appended claims are intended to encompass such variations as well.

For example, the update routine may be varied by, for example, changing the point in time at which the VTD vector is rolled over from all zeroes to all ones. Rather than doing this when the last nonzero VTD bit needs to be set to zero, the system may roll over the VTD vector. That is, every time a TLB access is done, the VTD bits are read out. Assume in a four-way associative structure that VTDbits [3:0] are read out as 0001, and way0 has a hit. So, the modified VTD to be written back will be 0000. The system can either 1) write back the 0000 and roll it over to 1111 on the next access, or
2) realize that it will need to be rolled, and do it at that time so that a 1110 will be written back (since way0 was hit). The advantage of 1) is that it takes slightly less logic and is easier to implement from a timing perspective. The advantage of 2) is that it keeps some more "real" information (reading VTDbits of 0000 tells nothing about the last access).

The replace algorithm also may be varied. For example, the location at which the VTD bits are searched to find a candidate for replacement may be started somewhere other than at the zero position. They may be searched in reverse order, starting from e[way] or some other position, at a random starting point, with a random search, etc.

Additionally, the invention may be used in a cache-line locking system. For example, in an N-way associative cache where each entry held one bit of VTD and one lock bit, the VTDconsider routine described above would see if a way was UnLocked, instead of checking for the way translating the correct page size.

What is claimed:

1. A method of updating replacement information in a cache memory having a plurality of entries, the entries arranged in a plurality of ways, the method comprising:
   determining whether a variable time decay (VTD) field of each of the plurality of entries, including an entry corresponding to a way just accessed, have all fully decayed;
   if all VTD fields have fully decayed, setting the VTD fields of all entries except the entry of the way just accessed to an undecayed state; and
   if all VTD fields are not fully decayed, decaying the VTD field of the entry of the way just accessed;
   wherein, at least two of the ways have a different number of entries.

2. A method according to claim 1, wherein the cache memory implements a TLB, and wherein the entries for at least two of the ways translate different size pages.

3. A method according to claim 1, wherein the number of ways is not a factor of 2.

4. A method according to claim 1, wherein the number of entries in the at least two ways are powers of 2.

5. A method according to claim 1, wherein the cache memory is set-associative.

6. A method of replacing data in a cache memory upon a cache miss, the method comprising:
   determining if a way within the cache can be considered for replacement;
   if the way can be considered for replacement, determining whether the way has already been accessed and therefore should be replaced; and
   indicating, in order of preference, that a particular way should be replaced, that a particular way can be replaced, and that the replacement failed;
   wherein, the cache memory comprises a plurality of entries arranged in a plurality of the ways, and wherein at least two of the ways have a different number of entries.

7. A method according to claim 6, wherein the cache memory implements a TLB, and wherein the entries for at least two of the ways translate different size pages.

8. A method according to claim 7, wherein the step of determining if a way can be considered for replacement includes determining a page size for which the way is configured to translate.

9. A method according to claim 6, wherein the cache memory is set-associative.

10. A method of maintaining a cache memory, the cache memory comprising a plurality of entries arranged in a plurality of ways, the method comprising:
    providing a decay field in each of the entries;
    updating the decay fields after each access to the cache memory in accordance with a decay replacement algorithm; and
    replacing data in the cache corresponding to certain of the entries upon a cache miss based on the updated decay fields;

wherein, at least two of the ways have a different number of entries.

11. A method according to claim 10, wherein the cache memory implements a TLB, and wherein the entries for at least two of the ways translate different size pages.

12. A method according to claim 11, wherein the step of replacing data in the cache includes determining a page size for which the ways are configured to translate.

13. A method according to claim 10, wherein the cache memory is set-associative.

14. A method according to claim 10, wherein the step of updating the decay fields includes:
   determining whether the decay fields of each of the plurality of entries, including an entry corresponding to a way just accessed, have all fully decayed;
   if all decay fields have fully decayed, setting the decay fields of all entries except the entry of the way just accessed to an undecayed state;
   if all decay fields are not fully decayed, decaying the decay field of the entry of the way just accessed.

15. A method according to claim 10, wherein the step of replacing data in the cache includes:
   determining if a way within the cache can be considered for replacement;
   if the way can be considered for replacement, determining whether the way has already been accessed and therefore should be replaced; and
   indicating, in order of preference, that a particular way should be replaced, that a particular way can be replaced, and that the replacement failed.

16. A cache memory comprising:
   a plurality of entries arranged in a plurality of ways;
   a decay field in each of the entries;
   means for updating the decay fields after each access to the cache memory in accordance with a decay replacement algorithm; and
   means for replacing data in the cache corresponding to certain of the entries upon a cache miss based on the updated decay fields;
   wherein, at least two of the ways have a different number of entries.

17. A cache memory according to claim 16, wherein the cache memory implements a TLB, and wherein the entries for at least two of the ways translate different size pages.

18. A cache memory according to claim 17, means for replacing data in the cache includes means for determining a page size for which the ways are configured to translate.

19. A cache memory according to claim 16, wherein the cache memory is set-associative.

20. A cache memory according to claim 16, wherein means for updating the decay fields includes:
   means for determining whether the decay fields of each of the plurality of entries, including an entry corresponding to a way just accessed, have all fully decayed;
   means for, if all decay fields have fully decayed, setting the decay fields of all entries except the entry of the way just accessed to an undecayed state;
   means for, if all decay fields are not fully decayed, decaying the decay field of the entry of the way just accessed.

21. A cache memory according to claim 16, wherein the means for replacing data in the cache includes:
   means for determining if a way within the cache can be considered for replacement;
   means for, if the way can be considered for replacement, determining whether the way has already been accessed and therefore should be replaced; and
   means for indicating, in order of preference, that a particular way should be replaced, that a particular way can be replaced, and that the replacement failed.

22. A cache memory comprising:
   a plurality of entries arranged in a plurality of ways;
   a decay field in each of the entries;
   a plurality of inverters that invert a hit vector that indicates which one of the ways was just accessed;
   a plurality of AND gates that combine the decay fields read from each of the entries and the inverted hit vector; and
   a plurality of multiplexers that provide updated decay fields for each of the entries in accordance with the operation of the inverters and AND gate;
   wherein, at least two of the ways have a different number of entries.

23. A cache memory according to claim 22, wherein the cache memory is set-associative.

24. A cache memory comprising:
   a plurality of entries arranged in a plurality of ways;
   a decay field in each of the entries;
   a first input for receiving a replace vector indicating whether each of the ways can be replaced;
   a second input for receiving a read vector structure comprising information from the decay fields;
   a first logic stage that selects a first way that can be replaced based on a logical combination of bits in the replace vector;
   a second logic stage that selects a second way that should be replaced based on a logical combination of bits in the read vector and the replace vector; and
   a multiplexer that chooses between the first and second ways in accordance with a predetermined preference;
   wherein, at least two of the ways have a different number of entries, and wherein the cache memory is set-associative.

* * * * *